(12) United States Patent
Kato et al.

(10) Patent No.: US 10,619,255 B2
(45) Date of Patent: Apr. 14, 2020

(54) ANODE FOR ALKALINE WATER ELECTROLYSIS AND METHOD FOR PRODUCING ANODE FOR ALKALINE WATER ELECTROLYSIS

(71) Applicants: DE NORA PERMELEC LTD, Fujisawa-shi, Kanagawa (JP); KAWASAKI JUKOGYO KABUSHIKI KAISHA, Kobe-shi, Hyogo (JP)

(72) Inventors: Akihiro Kato, Fujisawa (JP); Fumiya Tsujii, Fujisawa (JP); Yuji Kamei, Akashi (JP); Ikuo Shimomura, Akashi (JP); Ikuo Nagashima, Akashi (JP)

(73) Assignees: DE NORA PERMELEC LTD, Fujisawa, Kanagawa (JP); KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 16/084,851

(22) PCT Filed: Apr. 5, 2017

(86) PCT No.: PCT/JP2017/014284
§ 371 (c)(1),
(2) Date: Sep. 13, 2018

(87) PCT Pub. No.: WO2017/179473
PCT Pub. Date: Oct. 19, 2017

(65) Prior Publication Data
US 2019/0078220 A1 Mar. 14, 2019

(30) Foreign Application Priority Data
Apr. 12, 2016 (JP) ................. 2016-079262

(51) Int. Cl.
*C25B 11/04* (2006.01)
*B01J 23/00* (2006.01)
(Continued)

(52) U.S. Cl.
CPC ......... *C25B 11/0415* (2013.01); *B01J 23/002* (2013.01); *B01J 23/462* (2013.01);
(Continued)

(58) Field of Classification Search
CPC ...... C25B 1/02–1/04; C25B 1/14–1/16; C25B 11/00; C25B 11/0405;
(Continued)

(56) References Cited

U.S. PATENT DOCUMENTS

| 4,300,987 A | 11/1981 | Tseung et al. |
| 4,537,674 A | 8/1985 | Ovshinsky et al. |

(Continued)

FOREIGN PATENT DOCUMENTS

| CL | 2016003405 | 6/2017 |
| CN | 1920101 | 2/2007 |

(Continued)

OTHER PUBLICATIONS

Jain et al ("Low-temperature synthesis of perovskite-type oxides of lanthanum and cobalt and their electrocatalytic properties for oxygen evolution in alkaline solutions", Journal of the Chemical Society, Faraday Transactions, 1995, 91, pp. 1871-1875) (Year: 1995).*

(Continued)

*Primary Examiner* — Alexander W Keeling
(74) *Attorney, Agent, or Firm* — Hamre, Schumann, Mueller & Larson, P.C.

(57) ABSTRACT

Provided are an anode for alkaline water electrolysis that can achieve a low overpotential at low cost, and a method for producing the anode for alkaline water electrolysis. An (Continued)

anode for alkaline water electrolysis having electrode catalyst layers 2, 3 composed of a first catalyst component having either a nickel-cobalt spinel oxide or a lanthanide-nickel-cobalt perovskite oxide and a second catalyst component having at least one of iridium oxide and ruthenium oxide formed on the surface of a conductive substrate 1 composed of nickel or a nickel-based alloy, and a method for producing the anode for alkaline water electrolysis.

4 Claims, 2 Drawing Sheets

(51) Int. Cl.
    *B01J 23/46*     (2006.01)
    *C25B 1/10*     (2006.01)
    *C25B 9/00*     (2006.01)

(52) U.S. Cl.
    CPC ............... *B01J 23/468* (2013.01); *C25B 1/10* (2013.01); *C25B 9/00* (2013.01); *C25B 11/0484* (2013.01); *B01J 2523/37* (2013.01); *B01J 2523/845* (2013.01); *B01J 2523/847* (2013.01); *C01P 2002/36* (2013.01); *Y02E 60/366* (2013.01); *Y02E 70/10* (2013.01); *Y02P 20/133* (2015.11)

(58) Field of Classification Search
    CPC ............. C25B 11/0442; C25B 11/0478; B01J 23/002; B01J 23/10; B01J 23/755; B01J 23/76; B01J 23/83; B01J 2523/27; B01J 2523/845; B01J 2523/847
    See application file for complete search history.

(56) References Cited

U.S. PATENT DOCUMENTS

| | | | |
|---|---|---|---|
| 4,585,532 A | 4/1986 | Martin et al. | |
| 7,871,504 B2* | 1/2011 | Barker | C23C 4/02 |
| | | | 204/290.01 |
| 2004/0151896 A1* | 8/2004 | Houda | C25B 11/0473 |
| | | | 428/327 |
| 2007/0034505 A1* | 2/2007 | Ikematsu | C02F 1/46109 |
| | | | 204/280 |
| 2008/0237036 A1 | 10/2008 | Barker et al. | |
| 2014/0374249 A1 | 12/2014 | Cao et al. | |
| 2015/0191834 A1 | 7/2015 | Patru et al. | |
| 2016/0244888 A1 | 8/2016 | Cao et al. | |

FOREIGN PATENT DOCUMENTS

| | | |
|---|---|---|
| CN | 101292507 | 10/2008 |
| CN | 102605386 | 7/2012 |
| CN | 104011264 | 8/2014 |
| GB | 2174409 | 11/1986 |
| JP | 55-011132 | 1/1980 |
| JP | 55-500257 | 5/1980 |
| JP | 57-051276 | 3/1982 |
| JP | 57-052432 | 11/1982 |
| JP | 57-198289 | 12/1982 |
| JP | 57-200581 | 12/1982 |
| JP | 58-136789 | 8/1983 |
| JP | 60-159184 | 8/1985 |
| JP | 61-010557 | 3/1986 |
| JP | 61-250189 | 11/1986 |
| JP | 01-028837 | 6/1989 |
| JP | 2009-512781 | 3/2009 |
| JP | 2009-179871 | 8/2009 |
| JP | 2009-242922 | 10/2009 |
| JP | 2014-203809 | 10/2014 |

OTHER PUBLICATIONS

Silva et al ("Synthesis and Characterization of LaNixCo1-xO3 Perovskites via Complex Precursor Methods", Materials Sciences and Applications, 2010, 1, pp. 39-45), (Year: 2010).*

Vignesh et al ("Porous LaCo1-xNixO3-δ Nanostructures as an Efficient Electrocatalyst for Water Oxidation and for a Zinc-Air Battery", AC Applied Materials & Interfaces, Feb. 8, 2016, pp. 6019-6031), (Year: 2016).*

Chang et al ("Mechanical Alloying Preparation of La0.6Ca0.4Colr0.25O3.5-δ as a Bifunctional Electrocatalyst in Alkaline Electrolyte", Electrochemical and Solid-State Letters, 11, 4, 2008, pp. B47-B50). (Year: 2008).*

First Australian Examination Report, issued in the corresponding Australian patent application No. 2017250948, dated Apr. 5, 2019, 6 pages.

International Search Report, issued in the corresponding PCT application No. PCT/JP2017/014284, dated May 16, 2017, 3 pages.

P.W.T. Lu et al., "Electromechanical-Ellipsometric Studies of Oxide Film Formed on Nickel during Oxygen Evolution", H, Electrochem, Soc.: Electrochemical Science and Technology, vol. 125, No. 9, Sep. 1978, pp. 1416-1422.

Bowen et al., "Developments in Advanced Alkaline Water Electrolysis", Int J. Hydrogen Energy, vol. 9, No. 1/2, 1984, pp. 59-66.

Korean Office Action, issued in the corresponding Korean patent application No. 10-2018-7026791, dated Mar. 13, 2019, 18 pages, including machine translation.

Suffredini et al., "Recent developments in electrode materials for water electrolysis", International Journal of Hydrogen Energy, vol. 25, 2000, pp. 415-423.

Extended European Search Report, issued in the corresponding European patent application No. 17782290.5, dated Nov. 12, 2019, 5 pages.

Pletcher et al., "Prospects for alkaline zero gap water electrolysers for hydrogen production", International Journal of Hydrogen Energy, 2011, pp. 15089-15104.

Sapountzi et al., "Electrocatalysts for the generation of hydrogen, oxygen and synthesis gas", Progress in Energy and Combustion Science, 2017, pp. 1-35.

Chinese Office Action, issued in the corresponding Chinese patent application No. 201780018361.0, dated Nov. 20, 2019, 20 pages (including machine translation).

Cao et al., "Performance improving of perovskite type catalyst LaNi", Battery Bimonthly, vol. 39, No. 5, 2009, 3 pages.

Chilean Office Action, issued in the corresponding Chilean patent application No. CL2018002829, dated Jun. 20, 2019, 5 pages (including partial WIPO machine translation only, the original copy was filed Aug. 19, 2019).

* cited by examiner

ANODE FOR ALKALINE WATER ELECTROLYSIS AND METHOD FOR PRODUCING ANODE FOR ALKALINE WATER ELECTROLYSIS

TECHNICAL FIELD

The present invention relates to an anode used in alkaline water electrolysis, and relates particularly to an anode for alkaline water electrolysis that requires a low cell voltage and a method for producing the anode.

BACKGROUND ART

Hydrogen is a secondary energy source that is suitable for storage and transport, and has little environmental impact. As a result, hydrogen energy systems that use hydrogen as an energy carrier are attracting much interest. Currently, hydrogen is mainly produced by steam reforming of fossil fuels or the like. From the viewpoints of problems such as global warming and fossil fuel depletion, the importance of alkaline water electrolysis which uses renewable energy such as solar cells, wind power or hydroelectric power as a power source continues to increase.

Water electrolysis can be broadly classified into two types. One type is alkaline water electrolysis, which uses a high-concentration alkaline aqueous solution as the electrolyte. The other type is solid polymer water electrolysis, which uses a diamond electrode and uses a solid polymer electrolyte (SPE) as the electrolyte. When large-scale hydrogen production is performed by water electrolysis, it is considered that alkaline water electrolysis using an inexpensive material such as an iron-based metal of nickel or the like is more suitable than solid polymer water electrolysis using a diamond electrode.

The electrode reactions at the two electrodes are as follows.

Anode reaction: $2OH^- \rightarrow H_2O + \frac{1}{2}O_2 + 2e^-$ (1)

Cathode reaction: $2H_2O + 2e^- \rightarrow H_2 + 2OH^-$ (2)

High-concentration alkaline aqueous solutions increase in conductivity as the temperature increases, but the corrosiveness also increases. Accordingly, the upper limit for the operating temperature is suppressed to about 80 to 90° C. The development of electrolyzer structural materials and various piping materials that are capable of withstanding higher temperatures and high-concentration alkaline aqueous solutions, and the development of low-resistance diaphragms and electrodes having increased surface area and provided with a catalyst have enabled electrolysis performance to be improved to about 1.7 to 1.9 V at a current density of 0.3 to 0.4 $Acm^{-2}$ (efficiency: 78 to 87%).

The anode for alkaline water electrolysis typically uses a nickel-based material that is stable in the high-concentration alkaline aqueous solution, and it has been reported that a Ni-based electrode has a lifespan of several decades or longer in alkaline water electrolysis that uses a stable power source (Non-Patent Documents 1 and 2). However, Ni electrodes have a high overpotential, and suffer from poor productivity.

Conventionally, porous nickel or Ni or an alloy thereof has been used as the substrate of the anode for oxygen generation used in alkaline water electrolysis (Patent Document 1).

Further, the following types of metals or metal oxides have conventionally been used as the electrode catalyst layer of the anode for oxygen generation used in alkaline water electrolysis.

(1) Raney nickel (Patent Document 1)
(2) Platinum-group metals (Patent Documents 2 to 4)

Patent Document 2 discloses an anode that uses nickel and rhodium. Patent Document 3 discloses an anode that uses nickel, cobalt or silver, together with ruthenium, rhodium or iridium. Patent Document 4 discloses an electrode that uses platinum.

(3) Platinum-group metal oxides such as ruthenium oxide and iridium oxide (Patent Document 5)

(4) Alloys of a first metal composed of at least one metal selected from among iron, titanium, niobium, zirconium, tantalum, tin, molybdenum and bismuth, and a second metal composed of at least one metal selected from among nickel, cobalt, silver and platinum (Patent Document 6)

(5) Alloy systems based on nickel such as Ni—Co and Ni—Fe, nickel having an expanded surface area, and spinel $Co_3O_4$ and $NiCo_2O_4$ as ceramic materials (Patent Documents 7 and 8)

(6) Conductive oxides such as perovskite $LaCoO_3$ and $La_{0.6}St_{0.4}CoO_3$ (Patent Document 9)

CITATION LIST

Patent Documents

Patent Document 1: JP 55-011132 A
Patent Document 2: JP 57-052432 B
Patent Document 3: JP 61-010557 B
Patent Document 4: JP 2009-242922 A
Patent Document 5: JP 57-198289 A
Patent Document 6: JP 57-200581 A
Patent Document 7: JP 01-028837 B
Patent Document 8: JP 61-250189 A
Patent Document 9: JP 2009-179871 A

Non-Patent Document

Non-Patent Document 1: P.W.T. Lu, S. Srinivasan, J. Electrochem. Soc., 125, 1416 (1978)
Non-Patent Document 2: C. T. Bowen, Int. J. Hydrogen Energy, 9, 59 (1984)

SUMMARY OF INVENTION

Technical Problem

However, conventional electrodes used in alkaline water electrolysis all exhibit a high overpotential, and suffer from low productivity. Further reductions in the overpotential are required for practical applications.

Objects of the present invention are to provide an anode for alkaline water electrolysis that has a low cell voltage while retaining good corrosion resistance, and to provide a method for producing such an anode.

Solution to Problem

One aspect in the present invention is an anode for alkaline water electrolysis containing a conductive substrate having at least a surface composed of nickel or a nickel-based alloy, and an electrode catalyst layer formed on the surface of the conductive substrate, wherein a catalyst component that constitutes the electrode catalyst layer contains a first catalyst component having either a nickel-cobalt spinel oxide represented by a structural formula $NiCo_2O_4$, or a lanthanide-nickel-cobalt perovskite oxide represented by a structural formula $XNi_aCo_{1-a}O_3$ (wherein X represents at least one metal selected from among the lanthanides including lanthanum, cerium and praseodymium, and $0<a<1$), and a second catalyst component having at least one of iridium oxide and ruthenium oxide.

In this first aspect, the structural formula of the lanthanide-nickel-cobalt perovskite oxide is preferably $XNi_{0.2}Co_{0.8}O_3$.

In the first aspect, it is preferable that the lanthanide is lanthanum, and the lanthanide-nickel-cobalt perovskite oxide is a lanthanum-nickel-cobalt perovskite oxide.

In the first aspect, the electrode catalyst layer is preferably formed using a mixture of the first catalyst component and the second catalyst component.

In the first aspect, the electrode catalyst layer is preferably composed of an electrode catalyst layer with a stacked structure in which a first catalyst layer formed from the first catalyst component and a second catalyst layer formed from the second catalyst component are stacked.

In the first aspect, it is preferable that the first catalyst layer is formed on the surface of the conductive substrate, and the second catalyst layer is formed on the surface of the first catalyst layer.

In the first aspect, the amount of the second catalyst component, calculated as an amount of the component metal, is preferably at least 0.2 g/m$^2$.

A second aspect in the present invention is a method for producing an anode for alkaline water electrolysis that includes a step of applying, to a surface of a conductive substrate having at least the surface composed of nickel or a nickel-based alloy, a first solution which is either a solution obtained by mixing nickel ions and cobalt ions so that the molar ratio between the amounts of the respective metals is 1:2, or a solution obtained by mixing metal ions of at least one metal selected from among the lanthanides including lanthanum, cerium and praseodymium, together with nickel ions and cobalt ions so that the molar ratio between the amounts of the respective metals is 1:a:1−a ($0<a<1$), and a second solution containing at least one of iridium ions and ruthenium ions, and a step of subjecting the conductive substrate to a heat treatment at a temperature from 350° C. to 550° C. in an oxygen-containing atmosphere, thereby forming an electrode catalyst layer composed of a first catalyst component having either a nickel-cobalt spinel oxide represented by a structural formula $NiCo_2O_4$, or a lanthanide-nickel-cobalt perovskite oxide represented by a structural formula $XNi_aCo_{1-a}O_3$ (wherein X represents at least one metal selected from among the lanthanides including lanthanum, cerium and praseodymium, and $0<a<1$), and a second catalyst component having at least one of iridium oxide and ruthenium oxide.

In the second aspect, it is preferable that a mixture of the first solution and the second solution is applied to the surface of the conductive substrate having at least the surface composed of nickel or a nickel-based alloy, and the conductive substrate is then subjected to the heat treatment to form an electrode catalyst layer in which the first catalyst component and the second catalyst component are mixed.

In the second aspect, it is preferable that the first solution and the second solution are applied separately to the surface of the conductive substrate having at least the surface composed of nickel or a nickel-based alloy, and that the conductive substrate is subjected to a heat treatment after application of each solution, thereby forming an electrode catalyst layer with a stacked structure in which the first catalyst component and the second catalyst component are stacked.

In the second aspect, the heat treatment is preferably performed at a temperature from 350° C. to 400° C. in an oxygen-containing atmosphere.

In the second aspect, the amount of the second catalyst component, calculated as an amount of the component metal, is preferably at least 0.2 g/m$^2$.

In the second aspect, the lanthanide perovskite oxide is preferably a lanthanum-nickel-cobalt perovskite oxide.

In the second aspect, the structural formula of the lanthanide-nickel-cobalt perovskite oxide is preferably $XNi_{0.2}Co_{0.8}O_3$.

In the second aspect, the lanthanide is preferably lanthanum.

In the second aspect, the metal ions of at least one metal selected from among the lanthanides including lanthanum, cerium and praseodymium are preferably lanthanum ions.

In the second aspect, the second solution is preferably an acidic solution.

In the second aspect, the second solution is preferably an alkaline solution.

Advantageous Effects of Invention

The anode for alkaline water electrolysis according to the present invention contains a conductive substrate having at least a surface composed of nickel or a nickel-based alloy, and an electrode catalyst layer formed on the surface of the conductive substrate, and by forming the catalyst component that constitutes the electrode catalyst layer from a first catalyst component having a nickel-cobalt spinel oxide or a lanthanide-nickel-cobalt perovskite oxide, and a second catalyst component having at least one of iridium oxide and ruthenium oxide, an overpotential that is as much as 60 mV lower than conventional nickel electrodes can be achieved.

In the anode for alkaline water electrolysis according to the present invention, by also ensuring that the second catalyst component having at least one of iridium oxide and ruthenium oxide is included in an amount, calculated in terms of the amount of metal, that is at least 0.2 g/m$^2$, an even lower overpotential can be achieved.

Moreover, by subjecting the anode for alkaline water electrolysis according to the present invention to a heat treatment (thermal decomposition) in an oxygen-containing atmosphere at a temperature from 350° C. to 550° C., and preferably from 350° C. to 400° C., thermal decomposition of the first catalyst component and the second catalyst component is able to proceed satisfactorily, meaning the desired oxides can be obtained, and the coating strength onto the electrode substrate and the adhesive strength between the catalyst layers can be enhanced. As a result, separation of the catalyst component from the catalyst layer does not occur, the corrosion resistance improves, and a low overpotential can be achieved.

It is thought that the reason these improvements are obtained for the anode for alkaline water electrolysis is that by selecting appropriate catalyst components and an appropriate heat treatment temperature, at least one of iridium oxide and ruthenium oxide is highly dispersed in either the nickel-cobalt spinel oxide or the lanthanide-nickel-cobalt perovskite oxide, thus enabling a reduction in the overpotential.

DESCRIPTION OF EMBODIMENTS

The anode for alkaline water electrolysis according to the present invention and the method for producing the anode are described below with reference to the drawings.

Figure 1A:
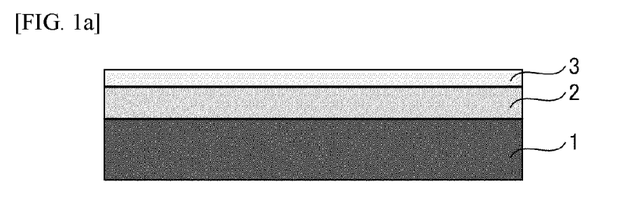
FIG. 1a is a cross-sectional view illustrating one embodiment of the anode for alkaline water electrolysis according to the present invention.

FIG. 1a is a cross-sectional view illustrating one embodiment of the anode for alkaline water electrolysis according to the present invention. The anode for alkaline water electrolysis has a stacked structure containing a conductive substrate 1 having at least the surface composed of nickel or a nickel-based alloy, a first catalyst layer 2 formed from a first catalyst component on the surface of the conductive substrate 1, and a second catalyst layer 3 formed from a second catalyst component.

Figure 1B:
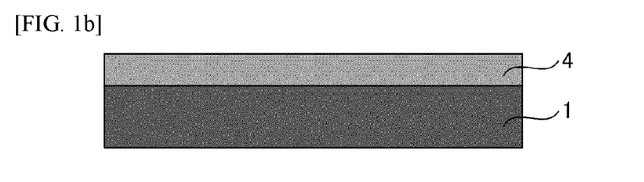
FIG. 1b is a cross-sectional view illustrating another embodiment of the anode for alkaline water electrolysis according to the present invention.

FIG. 1b is a cross-sectional view illustrating another embodiment of the anode for alkaline water electrolysis according to the present invention. This anode for alkaline water electrolysis contains the conductive substrate 1 having at least the surface composed of nickel or a nickel-based alloy, and a mixed catalyst layer 4 containing a mixture of a first catalyst component and a second catalyst component formed on the surface of the conductive substrate 1.

First are descriptions of the conductive substrate of the anode for alkaline water electrolysis that constitutes the present invention, and the electrode catalyst layer (the catalyst layer) formed on the surface of the conductive substrate.

<Conductive Substrate>

For reasons of conductivity and chemical stability, the conductive substrate 1 uses stainless steel, nickel, a nickel-based alloy, iron, or a Ni-plated iron material. At least the surface of the conductive substrate 1 is formed from nickel or a nickel-based alloy. The thickness of the conductive substrate 1 is preferably from 0.05 to 5 mm.

The conductive substrate 1 preferably has a shape with openings for removing the generated oxygen bubbles. Accordingly, a nickel expanded mesh or a porous nickel expanded mesh or the like can be used favorably as the conductive substrate 1. The porosity of the conductive substrate 1 is preferably from 10 to 95%.

In order to enhance the adhesion to the catalyst layer, the surface of the conductive substrate 1 is preferably subjected to a surface roughening treatment such as a blast treatment in which a powder is blasted onto the surface, an etching treatment that uses an acid that can dissolve the substrate, or a plasma spraying treatment. Moreover, in order to remove contaminant particles of metals or organic matter from the substrate surface, a chemical etching treatment is preferably performed. The amount of the conductive substrate consumed by the chemical etching treatment is preferably about 30 to 400 g/m$^2$.

Moreover, when forming the catalyst layer on the surface of the conductive substrate 1, a coating solution composed of an acid solution or an alkali solution is applied to the surface of the conductive substrate 1. In order to protect the conductive substrate 1 formed from nickel or a nickel-based alloy, the substrate is preferably fired in advance in the open atmosphere at a temperature of 450° C. to 550° C. for a period of 5 to 20 minutes to form a Ni oxide layer on the substrate surface.

<Catalyst Layer>

In terms of durability, the catalyst of the anode for alkaline water electrolysis may be composed solely of nickel or a nickel-based alloy. However, a catalyst composed solely of nickel or a nickel-based alloy has a high overpotential. Accordingly, in the present invention, a specific electrode catalyst layer is formed on the surface of the conductive substrate 1 which has at least the surface composed of nickel or a nickel-based alloy. The catalyst component that constitutes the electrode catalyst layer is composed of a first catalyst component having a nickel-cobalt spinel oxide or a lanthanide-nickel-cobalt perovskite oxide, and a second catalyst component having at least one of iridium oxide and ruthenium oxide.

The structural formula of the nickel-cobalt spinel oxide used in the present invention is represented by $NiCo_2O_4$.

The structural formula of the lanthanide-nickel-cobalt perovskite oxide used in the present invention is a perovskite oxide represented by the general formula $XYO_3$ in which the X component is at least one metal selected from among the lanthanides including lanthanum, cerium and praseodymium, and the Y component is composed of nickel and cobalt. In other words, the perovskite oxide is represented by the structural formula $XNi_aCo_{1-a}O_3$ (wherein X represents at least one metal selected from among the lanthanides including lanthanum, cerium and praseodymium, and 0<a<1).

The lanthanide is preferably lanthanum. The structural formula of such compounds is represented by $LaNi_aCo_{1-a}O_3$, and the use of $LaNi_{0.2}Co_{0.8}O_3$ is preferable.

The perovskite oxides disclosed in Patent Document 9 include lanthanum-strontium-cobalt perovskites, lanthanum-strontium-iron perovskites, and the like, and are limited to perovskites that use cobalt or iron as the Y component, with no disclosure nor mention made of the type of perovskites used in the present invention that use nickel as one of the Y components.

The overpotential was unable to be reduced adequately using an electrode catalyst layer for the anode for alkaline water electrolysis composed solely of the first catalyst component having a nickel-cobalt spinel oxide or a lanthanide-nickel-cobalt perovskite oxide. Consequently, an electrode catalyst layer containing a highly dispersed second catalyst component having at least one of iridium oxide and ruthenium oxide together with the first catalyst component is used.

The electrode catalyst layer of the anode for alkaline water electrolysis illustrated in FIG. 1a has a stacked structure of the first electrode catalyst layer 2 formed from the first catalyst and the second electrode catalyst layer 3 formed from the second catalyst component. In FIG. 1a, each of these layers may be formed from a single layer, but a first electrode catalyst layer 2 composed of a plurality of layers may be formed, and a second electrode catalyst layer 3 composed of a plurality of layers may also be formed.

Further, as illustrated in FIG. 1b, the mixed catalyst layer 4 for an anode for alkaline water electrolysis, prepared as a mixed layer by mixing the first catalyst component and the second catalyst component, may also be used as the electrode catalyst layer.

The steps for producing the anode for alkaline water electrolysis illustrated in FIG. 1a are described below.

As illustrated in FIG. 1a, the second electrode catalyst layer having the second catalyst component composed of at least one of iridium oxide and ruthenium oxide is formed on the surface of the first electrode catalyst layer 2 composed of the first catalyst component having a nickel-cobalt spinel oxide or a lanthanide-nickel-cobalt perovskite oxide. In those cases where pluralities of the first electrode catalyst layer 2 and the second electrode catalyst layer 3 are to be formed, a stacked structure is formed by sequentially stacking an additional first electrode catalyst layer 2 and second electrode catalyst layer 3 on top of the second electrode catalyst layer 3.

In order to form this type of stacked structure of the first catalyst layer 2 and the second catalyst layer 3, first, a solution (first solution) obtained either by mixing nickel ions and cobalt ions so that the molar ratio between the amounts of the respective metals is 1:2, or by mixing metal ions of at least one metal selected from among the lanthanides including lanthanum, cerium and praseodymium, together with nickel ions and cobalt ions, so that the molar ratio between the amounts of the respective metals is 1:a:1−a (0<a<1), is applied to the surface of the conductive substrate 1 having at least the surface composed of nickel or a nickel-based alloy. Subsequently, the conductive substrate 1 is subjected to a heat treatment at a temperature from 350° C. to 550° C. in an oxygen-containing atmosphere, thereby forming the first catalyst layer 2 composed of the first catalyst component having either a nickel-cobalt spinel oxide represented by the structural formula $NiCo_2O_4$, or a lanthanide-nickel-cobalt perovskite oxide represented by the structural formula $XNi_aCo_{1-a}O_3$ (wherein X represents at least one metal selected from among the lanthanides including lanthanum, cerium and praseodymium, and 0<a<1).

When forming the first catalyst layer 2 composed of the first catalyst component, the metal ions of at least one metal selected from among the lanthanides including lanthanum, cerium and praseodymium, and the nickel ions and cobalt ions may each be used in the form of the respective nitrate salt.

Subsequently, a solution (second solution) containing at least one of iridium ions and ruthenium ions is applied to the surface of the first catalyst layer 2. The conductive substrate 1 is then subjected to a heat treatment at a temperature from 350° C. to 550° C. in an oxygen-containing atmosphere, thereby forming the second catalyst layer 3 composed of the second catalyst component.

In this manner, the first catalyst layer 2 and the second catalyst layer 3 are formed as a stacked structure. The first catalyst layer 2 and the second catalyst layer 3 may be stacked in any order. In those cases where an electrode catalyst layer with a stacked structure having two or more stacked layers is formed, the second catalyst component in the second catalyst layer 3 migrates into the first catalyst layer 2. In other words, the first catalyst component and the second catalyst component are mixed, at least at the interface between the first catalyst layer 2 and the second catalyst layer 3.

In those cases where the first catalyst layer 2 and the second catalyst layer 3 are formed as a stacked structure, if a nitrate salt solution is used as the solution containing at least one of iridium ions and ruthenium ions, then there is a possibility that the nitrate ions may corrode and cause detachment of the nickel-cobalt spinel oxide or the lanthanide-nickel-cobalt perovskite oxide. Accordingly, an alkaline solution is preferably used as the solution containing at least one of iridium ions and ruthenium ions.

The steps for producing the anode for alkaline water electrolysis illustrated in FIG. 1b are described below.

In this case, rather than forming the electrode catalyst layer as a stacked structure, the second solution is added to and mixed with the first solution to prepare a mixed solution. This mixed solution is then applied to the surface of the conductive substrate 1 having at least the surface composed of nickel or a nickel-based alloy. Subsequently, heating is performed at a temperature of 350 to 550° C., thereby forming the mixed catalyst layer 4 containing a mixture of the first catalyst component and the second catalyst component.

In those cases where the mixed catalyst layer 4 containing a mixture of the first catalyst component and the second catalyst component is formed in this manner, a nitrate solution may be used as the solution containing at least one of iridium ions and ruthenium ions.

The heat treatment must be performed at a temperature from 350° C. to 550° C. If the treatment temperature is 350° C. or lower, then the thermal decomposition of the first catalyst component and the second catalyst component is insufficient, the coating strength onto the electrode substrate and the adhesive strength between the catalyst layers are inadequate, and the catalyst components tend to separate from the catalyst layer. On the other hand, if the temperature is 550° C. or higher, then oxidation of the first catalyst component and the second catalyst component tends to proceed, and the overpotential increases. Oxidation of the first catalyst component and the second catalyst component tends to start when the temperature is 400° C. or higher. Consequently, the temperature of the heat treatment is preferably from 350° C. to 400° C.

The time of the heat treatment is preferably from 5 to 60 minutes, and more preferably from 5 to 20 minutes. If the time of the heat treatment is 5 minutes or less, then the catalyst production is insufficient, the coating strength onto the electrode substrate and the adhesive strength between the catalyst layers are inadequate, and the catalyst components tend to separate from the catalyst layer. On the other hand, if the time is 60 minutes or longer, then oxidation of the catalyst components tends to proceed, and the overpotential increases. Oxidation of the catalyst components tends to start when the treatment time is 20 minutes or longer. Consequently, the time of the heat treatment is more preferably from 5 to 20 minutes.

The amount of iridium oxide or ruthenium oxide, calculated as an amount of the component metal, is preferably at least 0.2 g/m². In order to maintain a low overpotential, an amount of iridium metal or ruthenium metal of at least 0.2 g/m² is required. If this amount is less than 0.2 g/m², the overpotential increases.

Figure 2:
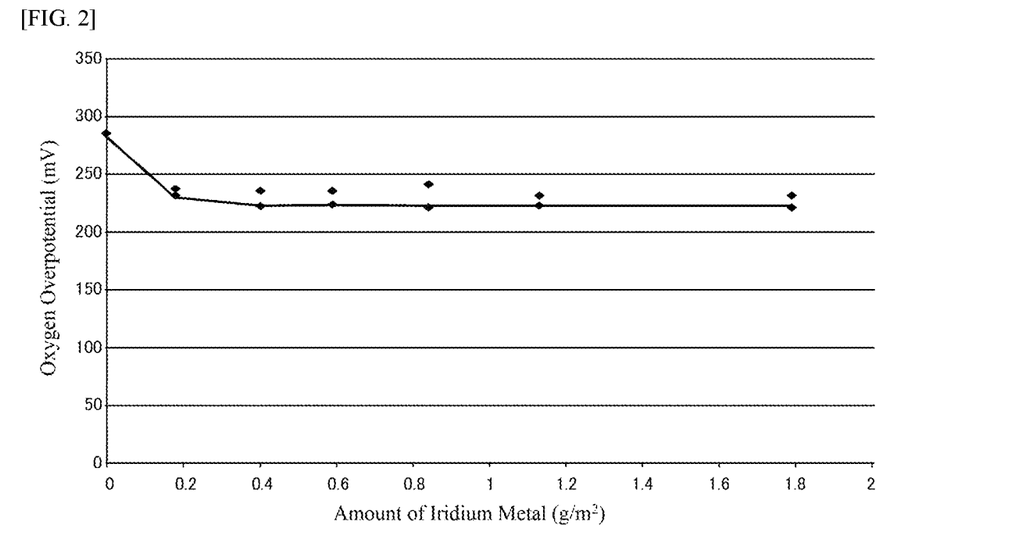
FIG. 2 is a graph illustrating the relationship between the proportion of the second catalyst component used in the anode for alkaline water electrolysis of the present invention and the oxygen overpotential.

FIG. 2 illustrates the relationship between the proportion of iridium oxide ($IrO_2$) used in an anode for alkaline water electrolysis having the structure illustrated in FIG. 1a and the oxygen overpotential. The anode for alkaline water electrolysis has a structure in which the first catalyst layer 2 composed of the nickel-cobalt spinel oxide ($NiCo_2O_4$) as the first catalyst component is formed on the surface of the conductive substrate 1 formed from a nickel alloy, and the second catalyst layer 3 composed of iridium oxide ($IrO_2$) as the second catalyst component is formed on the surface of the first catalyst layer 2. Using this anode for alkaline water electrolysis, the overpotential was measured in a 25 wt % solution of potassium hydroxide at 80° C. and a current density of 4 kA/m².

Based on FIG. 2, it is evident that by ensuring that the amount of iridium oxide of the second catalyst component, calculated as the amount of iridium metal, is at least 0.2 g/m², the oxygen overpotential can be kept low.

Further, similar results were obtained when ruthenium oxide was either used alone or mixed with iridium oxide as the second catalyst component.

In the method for forming the catalyst layer according to the present invention, coating film formation methods such as the CVD and PVD methods described below can also be used as alternative methods to the above heat treatment method.

(1) CVD method: a gas containing a metal is decomposed using a plasma to generate metal atoms, and a coating film is formed on a substrate held at a high temperature (of about 800° C.).

(2) PVD Methods: These Include Sputtering Methods and Ion Plating Methods.

A sputtering method is a method in which ions of argon or the like are collided onto a solid metal to eject metal atoms as particles. Because the sputtered particles are substantially electrically neutral, the energy of the particles that form the coating film is low.

An ion plating method is a method in which an electron flow is generated, the resulting heat is used to evaporate a solid metal to obtain metal atoms, and at the same time, most of the atoms are ionized, with the ions forming the coating film.

Ion plating methods are classified as arc ion plating, hollow cathode and electron gun depending on the method used for generating the electron current.

The arc ion plating method is a method in which a target is subjected to vacuum discharge between a cathode and an anode, thereby evaporating and ionizing material from the surface of the target. The ionization rate of the metal vapor is a high value of at least 80%, enabling a film having excellent density and adhesion to be formed at high speed. In the hollow cathode method, the ionization rate is moderate. In the electron gun method, the ionization rate is low.

Figure 3:
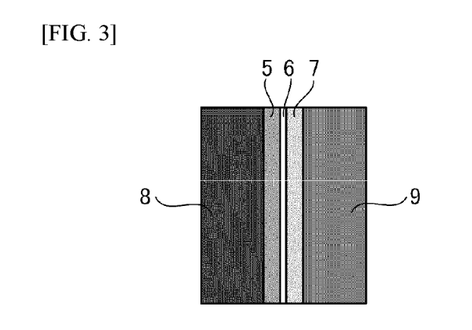
FIG. 3 is a schematic view of an electrolytic cell that uses the anode for alkaline water electrolysis according to the present invention.

Next, FIG. 3 is used to describe the structural materials used when the anode for alkaline water electrolysis according to the present invention is used in an alkaline water electrolytic cell.

In FIG. 3, numeral 5 represents the anode, 6 represents a diaphragm (electrolysis diaphragm), and 7 represents the cathode. Numeral 8 represents an anode chamber, and 9 represents a cathode chamber.

For the cathode 7, it is necessary to select a substrate material that can withstand alkaline water electrolysis and a catalyst with a small cathode overpotential. Examples of materials that can be used as the cathode substrate include simple nickel, or a nickel substrate that has been coated with an active cathode. In a similar manner to the anode 5, a nickel expanded mesh or a porous nickel expanded mesh can be used favorably as the cathode substrate. Examples of materials that can be used favorably as the electrode catalyst material for the cathode include the same electrode catalyst materials as those used in the electrode catalyst layer described above.

For the diaphragm 6, asbestos, nonwoven fabrics, ion exchange membranes, porous polymer membranes, and composite membranes of an inorganic material and an organic polymer may be used. For example, an ion-permeable membrane formed by disposing an organic fiber fabric in a mixture of a hydrophilic inorganic material such as a calcium phosphate compound or calcium fluoride and an organic binder material selected from among polysulfone, polypropylene and polyvinylidene fluoride may be used. Further, an ion-permeable membrane containing a stretched organic fiber fabric in a film-forming mixture composed of a particulate inorganic hydrophilic material selected from among oxides and hydroxides of antimony and zirconium, and an organic binder selected from among fluorocarbon polymers, polysulfone, polypropylene, polyvinyl chloride and polyvinyl butyral may also be used.

In the alkaline water electrolysis in the present invention, a solution obtained by adding a high-concentration alkaline water until a prescribed alkali concentration is achieved is used as the electrolyte. The electrolyte is preferably a caustic alkali such as caustic potash or caustic soda. The concentration of the electrolyte is preferably from 1.5 to 40% by mass. In terms of suppressing power consumption, a concentration of 15 to 40% by mass, which represents the region in which the electrical conductivity is large, is particularly preferred. However, if consideration is also given to the costs associated with the electrolysis, and the corrosiveness, viscosity and usability of the electrolyte, then a concentration of 20 to 30% by mass is even more desirable.

EXAMPLES

Next is a description of examples of the present invention, but the present invention is not limited to these examples. The catalyst composition, the firing temperature, the result of measuring the overpotential and the catalyst metal component ratio for each of Examples 1 to 9 and Comparative Examples 1 to 5 are shown in Table 1.

Example 1 illustrates an example in which $NiCo_2O_4$ was used as the first catalyst component, $IrO_2$ was used as the second catalyst component, the firing temperature was set to 350° C., and the first catalyst component and the second catalyst component were formed in a stacked structure.

Example 2 illustrates an example in which $NiCo_2O_4$ was used as the first catalyst component, $IrO_2$ was used as the second catalyst component, the firing temperature was set to 450° C., and the first catalyst component and the second catalyst component were formed in a stacked structure.

Example 3 illustrates an example in which $NiCo_2O_4$ was used as the first catalyst component, $IrO_2$ was used as the second catalyst component, the firing temperature was set to 550° C., and the first catalyst component and the second catalyst component were formed in a stacked structure.

Example 4 illustrates an example in which $NiCo_2O_4$ was used as the first catalyst component, $IrO_2$ was used as the second catalyst component, the firing temperature was set to 350° C., and the first catalyst component and the second catalyst component were formed as a mixed layer.

Example 5 illustrates an example in which $NiCo_2O_4$ was used as the first catalyst component, $IrO_2$ was used as the second catalyst component, the firing temperature was set to 450° C., and the first catalyst component and the second catalyst component were formed as a mixed layer.

Example 6 illustrates an example in which $LaNi_{0.2}Co_{0.8}O_3$ was used as the first catalyst component, $IrO_2$ was used as the second catalyst component, the firing temperature was set to 350° C., and the first catalyst component and the second catalyst component were formed in a stacked structure.

Example 7 illustrates an example in which $LaNi_{0.2}Co_{0.8}O_3$ was used as the first catalyst component, $IrO_2$ was used as the second catalyst component, the firing temperature was set to 350° C., and the first catalyst component and the second catalyst component were formed as a mixed layer.

Example 8 illustrates an example in which $NiCo_2O_4$ was used as the first catalyst component, $RuO_2$ was used as the second catalyst component, the firing temperature was set to 350° C., and the first catalyst component and the second catalyst component were formed as a mixed layer.

Example 9 illustrates an example in which $NiCo_2O_4$ was used as the first catalyst component, $RuO_2$ was used as the second catalyst component, the firing temperature was set to 450° C., and the first catalyst component and the second catalyst component were formed as a mixed layer.

Example 1

A nickel mesh was etched for 3 minutes in boiling 20% hydrochloric acid, and was then baked at 500° C. for 30 minutes to prepare a nickel electrode substrate. Next, Ni nitrate and Co nitrate were dissolved in pure water in amounts that yielded 33.3 mol % of nickel and 66.7 mol % of cobalt, thus forming a coating solution. That coating solution was applied to the substrate in an amount that provided a metal amount of 1 $g/m^2$ per application. Subsequently, thermal decomposition was performed in an air circulating electric oven (350° C., 15 minutes). These steps were performed 4 times, thus producing an $NiCo_2O_4$ catalyst layer containing an amount of metal of 4 $g/m^2$.

Thereafter, an iridium hexamine solution was applied in an amount sufficient to produce an amount of iridium oxide, calculated as the amount of iridium metal, of 1 $g/m^2$. Subsequently, thermal decomposition was performed in an air circulating electric oven (350° C., 15 minutes), thus producing an electrode having an electrode catalyst layer composed of a stacked structure of an $NiCo_2O_4$ catalyst layer and an $IrO_2$ catalyst layer.

The overpotential of that electrode was measured in a 25 wt % solution of potassium hydroxide at 80° C., at current densities of 4 $kA/m^2$ and 6 $kA/m^2$.

Example 2

Using the iridium hexamine solution prepared in Example 1, iridium oxide was applied to the $NiCo_2O_4$ catalyst layer formed in Example 1 in an amount sufficient to produce an amount of iridium oxide, calculated as the amount of iridium metal, of 1 $g/m^2$. Subsequently, thermal decomposition was performed in an air circulating electric oven (450° C., 15 minutes), thus forming an electrode catalyst layer composed of a stacked structure of an $NiCo_2O_4$ catalyst layer and an $IrO_2$ catalyst layer. The overpotential was measured using the same method as Example 1.

Example 3

Using the iridium hexamine solution prepared in Example 1, iridium oxide was applied to the $NiCo_2O_4$ catalyst layer formed in Example 1 in an amount sufficient to produce an amount of iridium oxide, calculated as the amount of iridium metal, of 1 $g/m^2$. Subsequently, thermal decomposition was performed in an air circulating electric oven (550° C., 15 minutes), thus forming an electrode catalyst layer composed of a stacked structure of an $NiCo_2O_4$ catalyst layer and an $IrO_2$ catalyst layer. The overpotential was measured using the same method as Example 1.

Example 4

Ni nitrate, Co nitrate and Ir nitrate were dissolved in pure water in amounts that yielded 31 mol % of nickel, 62 mol % of cobalt and 7 mol % of iridium, thus forming a coating solution, and this coating solution was applied to the substrate prepared in Example 1. Subsequently, thermal decomposition was performed in an air circulating electric oven (350° C., 15 minutes) thus forming a mixed catalyst layer in which the $IrO_2$ catalyst was highly dispersed within the $NiCo_2O_4$ catalyst layer. These steps formed a catalyst layer containing 1 $g/m^2$ of nickel and cobalt and 0.25 $g/m^2$ of iridium, and by performing these steps 4 times, an electrode was produced. The overpotential was measured using the same method as Example 1.

Example 5

With the exception of performing the thermal decomposition coating in an air circulating electric oven (450° C., 15 minutes), a mixed catalyst layer in which the $IrO_2$ catalyst was highly dispersed within the $NiCo_2O_4$ catalyst layer was formed under the same conditions as Example 4. The overpotential was measured using the same method as Example 1.

Example 6

Ni nitrate, Co nitrate and La nitrate were dissolved in pure water in amounts that yielded 10 mol % of nickel, 40 mol % of cobalt and 50 mol % of lanthanum, thus preparing a coating solution. This coating solution was applied to the substrate prepared in Example 1, and thermal decomposition was then performed in an air circulating electric oven (350° C., 15 minutes), thus forming a first catalyst layer 2 composed of $LaNi_{0.2}Co_{0.8}O_3$. Subsequently, using the iridium hexamine solution prepared in Example 1, iridium oxide was applied to the first catalyst layer 2 in an amount sufficient to produce an amount of iridium oxide, calculated as the amount of iridium metal, of 1 $g/m^2$. Subsequently, thermal decomposition was performed in an air circulating electric oven (350° C., 15 minutes), thus forming a second catalyst layer 3 composed of iridium oxide. This completed production of an electrode having an electrode catalyst layer with a stacked structure. The overpotential of the electrode was measured using the same method as Example 1.

Example 7

Ni nitrate, Co nitrate, La nitrate and Ir nitrate were dissolved in pure water in amounts that yielded 9 mol % of nickel, 36 mol % of cobalt, 44 mol % of lanthanum and 11 mol % of iridium, thus preparing a coating solution. This coating solution was applied to the substrate prepared in Example 1, and thermal decomposition was then performed in an air circulating electric oven (350° C., 15 minutes). By performing these steps 4 times, a mixed catalyst layer containing a mixture of $LaNi_{0.2}Co_{0.8}O_3$ and iridium oxide was formed. The amounts of the catalyst components within the catalyst layer, calculated as the amounts of the component metals, were 4 $g/m^2$ for nickel, cobalt and lanthanum, and 1 $g/m^2$ for iridium. The overpotential of this electrode was measured using the same method as Example 1.

Example 8

Ni nitrate, Co nitrate and Ru nitrate were dissolved in pure water in amounts that yielded 29 mol % of nickel, 58 mol % of cobalt and 13 mol % of ruthenium, thus forming a coating solution. This coating solution was applied to the substrate prepared in Example 1. Subsequently, thermal decomposition was performed in an air circulating electric oven (350° C., 15 minutes). These steps were performed 4 times, thus obtaining a mixed catalyst layer in which the $RuO_2$ catalyst was highly dispersed within the $NiCo_2O_4$ catalyst layer. The amounts of the catalyst components within the catalyst layer, calculated as the amounts of the component metals, were 4 $g/m^2$ for nickel and cobalt, and 1 $g/m^2$ for ruthenium. The overpotential of the electrode was measured using the same method as Example 1.

Example 9

Ni nitrate, Co nitrate and Ru nitrate were dissolved in pure water in amounts that yielded 29 mol % of nickel, 58 mol % of cobalt and 13 mol % of ruthenium, thus forming a coating solution. This coating solution was applied to the substrate prepared in Example 1. Subsequently, thermal decomposition was performed in an air circulating electric oven (450° C., 15 minutes). These steps were performed 4 times, thus obtaining a mixed catalyst layer in which the $RuO_2$ catalyst was highly dispersed within the $NiCo_2O_4$ catalyst layer. The amounts of the catalyst components within the catalyst layer, calculated as the amounts of the component metals, were 4 $g/m^2$ for nickel and cobalt, and 1 $g/m^2$ for ruthenium. The overpotential of the electrode was measured using the same method as Example 1.

Comparative Example 1

A nickel mesh was etched for 3 minutes in boiling 20% hydrochloric acid, and was then baked at 500° C. for 30 minutes to prepare a nickel electrode. The overpotential of that electrode was measured in a 25 wt % solution of potassium hydroxide at 80° C., at current densities of 4 $kA/m^2$ and 6 $kA/m^2$.

Comparative Example 2

Ni nitrate and Co nitrate were dissolved in pure water in amounts that yielded 33.3 mol % of nickel and 66.7 mol % of cobalt, thus forming a coating solution. That coating solution was applied to the substrate produced in Comparative Example 1 in an amount that provided a metal amount of 1 $g/m^2$ per application, and thermal decomposition was then performed in an air circulating electric oven (350° C., 15 minutes). These steps were performed 4 times, thus producing an electrode containing an amount of metal of 4 $g/m^2$. The overpotential of that electrode was measured in a 25 wt % solution of potassium hydroxide at 80° C., at current densities of 4 $kA/m^2$ and 6 $kA/m^2$.

Comparative Example 3

An electrode was produced using the same method as Comparative Example 2. The firing temperature was set to 450° C. The overpotential of the electrode was measured in a 25 wt % solution of potassium hydroxide at 80° C., at current densities of 4 $kA/m^2$ and 6 $kA/m^2$.

Comparative Example 4

An electrode was produced using the same method as Comparative Example 2. The firing temperature was set to 550° C. The overpotential of the electrode was measured in a 25 wt % solution of potassium hydroxide at 80° C., at current densities of 4 $kA/m^2$ and 6 $kA/m^2$.

Comparative Example 5

Ni nitrate, Co nitrate and La nitrate were dissolved in pure water in amounts that yielded 10 mol % of nickel, 40 mol % of cobalt and 50 mol % of lanthanum, thus preparing a coating solution. This coating solution was applied to the substrate prepared in Comparative Example 1, and thermal decomposition was then performed in an air circulating electric oven (350° C., 15 minutes), thus forming a catalyst layer. The overpotential was measured using the same method as Comparative Example 1.

<Results>

The results are shown in Table 1.

In Examples 1, 4, 6, 7 and 8, the overpotential was lowest, with values of 218 to 224 mV at 4 $kA/m^2$ and 230 to 234 mV at 6 $kA/m^2$.

In contrast, with the Ni electrode of Comparative Example 1, the oxygen overpotential was extremely high, with values of 320 mV at 4 $kA/m^2$ and 340 mV at 6 $kA/m^2$. Even with the $NiCo_2O_4$ of Comparative Examples 2 to 4, the overpotential was from 276 to 325 mV at 4 $kA/m^2$ and from 284 to 332 mV at 6 $kA/m^2$. Even with the $LaNi_{0.2}Co_{0.8}O_3$ of Comparative Example 5, the overpotential was high, with values of 287 mV at 4 $kA/m^2$ and 297 mV at 6 $kA/m^2$.

TABLE 1

| Examples | Composition | Firing temperature (° C.) | Overpotential 4 $kA/m^2$ (mV) | Overpotential 6 $kA/m^2$ (mV) | Ni (mol %) | Co (mol %) | La (mol %) | Ir (mol %) | Ru (mol %) |
|---|---|---|---|---|---|---|---|---|---|
| Example 1 | $IrO_2$ on $NiCo_2O_4$ | 350 | 222 | 234 | 31 | 62 | — | 7 | — |
| Example 2 | $IrO_2$ on $NiCo_2O_4$ | 450 | 239 | 246 | 31 | 62 | — | 7 | — |
| Example 3 | $IrO_2$ on $NiCo_2O_4$ | 550 | 259 | 271 | 31 | 62 | — | 7 | — |
| Example 4 | $IrO_2$ in $NiCo_2O_4$ | 350 | 218 | 230 | 31 | 62 | — | 7 | — |
| Example 5 | $IrO_2$ in $NiCo_2O_4$ | 450 | 258 | 263 | 31 | 62 | — | 7 | — |
| Example 6 | $IrO_2$ on $LaNi_{0.2}Co_{0.8}O_3$ | 350 | 224 | 230 | 9 | 36 | 44 | 11 | — |
| Example 7 | $IrO_2$ in $LaNi_{0.2}Co_{0.8}O_3$ | 350 | 220 | 232 | 9 | 36 | 44 | 11 | — |
| Example 8 | $RuO_2$ in $NiCo_2O_4$ | 350 | 222 | 230 | 29 | 58 | — | — | 13 |
| Example 9 | $RuO_2$ in $NiCo_2O_4$ | 450 | 258 | 263 | 29 | 58 | — | — | 13 |
| Comparative Example 1 | Ni | — | 320 | 340 | 100 | — | — | — | — |
| Comparative Example 2 | $NiCo_2O_4$ | 350 | 276 | 284 | 33.3 | 66.7 | — | — | — |
| Comparative Example 3 | $NiCo_2O_4$ | 450 | 300 | 308 | 33.3 | 66.7 | — | — | — |
| Comparative Example 4 | $NiCo_2O_4$ | 550 | 325 | 332 | 33.3 | 66.7 | — | — | — |
| Comparative Example 5 | $LaNi_{0.2}Co_{0.8}O_3$ | 350 | 287 | 297 | 10 | 40 | 50 | — | — |

In Table 1, "IrO$_2$ on NiCo$_2$O$_4$" means the IrO$_2$ catalyst layer was stacked on the surface of the NiCo$_2$O$_4$. "IrO$_2$ in NiCo$_2$O$_4$" means a mixed layer in which the IrO$_2$ had been mixed within the NiCo$_2$O$_4$. These meanings of "on" and "in" have the same meanings for other components.

Example 10

Electrodes were prepared in the same manner as Example 1, with the amount of Ir varied from 0 g/m$^2$ to 1.8 g/m$^2$. The oxygen overpotential was measured using the same method as Example 1.

Based on the results (FIG. 2), it was evident that an overpotential of 220 mV could be achieved for amounts of iridium of at least 0.2 g/m$^2$.

<Continuous Electrolysis Test>

Example 11

Using each of the above anodes from Comparative Example 1, Example 1 and Example 4, and using a Ru-based cathode for the cathode and a polyethersulfone-based membrane for the diaphragm, continuous electrolysis tests were conducted. The cell illustrated in FIG. 3 was used, and the voltage was measured under conditions including 25% KOH, 80° C. and 40 A/dm$^2$.

The results revealed a cell voltage of 1.72 V for Comparative Example 1. In contrast, the cell voltage was 1.64 V for Example 1 and 1.69 V for Example 4, and the voltages were stable.

DESCRIPTION OF THE REFERENCE SIGNS

1: Nickel substrate
2: First catalyst layer
3: Second catalyst layer
4: Mixed catalyst layer
5: Anode
6: Diaphragm
7: Cathode
8: Anode chamber
9: Cathode chamber

The invention claimed is:

1. An anode for alkaline water electrolysis comprising:
   a conductive substrate having at least a surface that comprises nickel or a nickel-based alloy; and
   an electrode catalyst layer formed on the surface of the conductive substrate,
   wherein the electrode catalyst layer has a layered structure comprising a first catalyst layer and a second catalyst layer, wherein
      the first catalyst layer comprises: a first catalyst component comprising a lanthanide-nickel-cobalt perovskite oxide represented by a structural formula $XNi_aCo_{1-a}O_3$, wherein X represents at least one lanthanide selected from the group consisting of lanthanum, cerium, and praseodymium, and a satisfies 0<a<1, and
      the second catalyst layer comprises: a second catalyst component comprising at least one material selected from the group consisting of iridium oxide and ruthenium oxide, and
   the first catalyst layer is formed on the surface of the conductive substrate, and the second catalyst layer is formed on a surface of the first catalyst layer.

2. The anode for alkaline water electrolysis according to claim 1,
   wherein the structural formula of the lanthanide-nickel-cobalt perovskite oxide is $XNi_{0.2}Co_{0.8}O_3$.

3. The anode for alkaline water electrolysis according to claim 1,
   wherein the lanthanide is lanthanum, and
   the lanthanide-nickel-cobalt perovskite oxide is a lanthanum-nickel-cobalt perovskite oxide.

4. The anode for alkaline water electrolysis according to claim 1,
   wherein an amount of the second catalyst component, calculated as an amount of a component metal, is in a range of at least 0.2 g/m$^2$.

* * * * *